United States Patent [19]
Morris et al.

[11] Patent Number: 5,861,935
[45] Date of Patent: Jan. 19, 1999

[54] PROGRESSIVE LENS ELEMENTS AND METHODS FOR DESIGNING AND USING SAME

[75] Inventors: Michael Alan Morris, Santa Rose; Eric Franklin Barkan, Novato, both of Calif.; Simon John Edwards, St. Peters, Australia; Dimitrios Jack Kris, Fulham Gardens, Australia; Anthony Alan Lee, Plympton Park, Australia; Mark Mattison-Shupnick, Petaluma, Calif.; Colin Maurice Perrott, Mount Barker; Karen Lee Roberts, Williamstown, both of Australia; David Howard Sklar, San Francisco, Calif.

[73] Assignee: Sola International Holdings Ltd., Australia

[21] Appl. No.: 782,493

[22] Filed: Jan. 10, 1997

[30] Foreign Application Priority Data

Apr. 4, 1996 [AU] Australia ................................ PN9112
Jul. 9, 1996 [AU] Australia ................................ PO0895

[51] Int. Cl.⁶ ................................................... G02C 7/06
[52] U.S. Cl. .................................................. 351/169
[58] Field of Search .................................. 351/168, 169, 351/170, 171, 172

[56] References Cited

U.S. PATENT DOCUMENTS

| Re. 34,132 | 11/1992 | Kitani | 351/169 |
|---|---|---|---|
| 3,711,191 | 1/1973 | Tagnon | 351/169 |
| 3,785,724 | 1/1974 | Cretin-Maitenaz | 351/169 |
| 4,240,719 | 12/1980 | Guilino et al. | 351/169 |
| 4,315,673 | 2/1982 | Guilino et al. | 351/169 |
| 4,537,479 | 8/1985 | Shinohara et al. | 351/169 |
| 4,606,622 | 8/1986 | Fuëter et al. | 351/169 |
| 4,762,408 | 8/1988 | Shinohara | 351/169 |
| 4,778,266 | 10/1988 | Maitenaz | 351/169 |
| 4,838,674 | 6/1989 | Dufour | 351/169 |

(List continued on next page.)

FOREIGN PATENT DOCUMENTS

| 0562336A | 9/1993 | European Pat. Off. |
|---|---|---|
| 1509090 | 12/1967 | France . |
| 54-85743 | 7/1979 | Japan . |
| 816338 | 7/1959 | United Kingdom . |
| 2294553 | 5/1993 | United Kingdom . |
| WO95/27229 | 12/1995 | WIPO . |
| WO96/13748 | 3/1996 | WIPO . |

*Primary Examiner*—Scott J. Sugarman
*Attorney, Agent, or Firm*—Burns, Doane, Swecker & Mathis LLP

[57] ABSTRACT

A series of progressive ophthalmic lens elements, each lens element including a lens surface having an upper viewing zone having a surface power to achieve a refracting power corresponding to distance vision;

a lower viewing zone having a greater surface power than the upper viewing zone to achieve a refracting power corresponding to near vision;

a corridor of relatively low surface astigmatism connecting the upper and lower zones, said corridor having a surface power varying from that of the upper viewing zone to that of the lower viewing zone;

the progressive ophthalmic lens series including a first set of lens elements having a base curve(s) suitable for use in providing a range of distance prescriptions for a first category of patient; and a second set of lens elements having a base curve(s) suitable for use in providing a range of distance prescriptions for a second category of patient; each lens element within a set differing in prescribed addition power and including a progressive design, in at least one of the upper and lower viewing zones, depending upon the addition power of the lens element;

the lens elements in the first set differing substantively in progressive design from the corresponding lens elements in the second set due to the differences in base curve(s).

17 Claims, 7 Drawing Sheets

U.S. PATENT DOCUMENTS

| | | | |
|---|---|---|---|
| 4,934,808 | 6/1990 | Kitani | 351/169 |
| 5,137,343 | 8/1992 | Kelch et al. | 351/169 |
| 5,270,745 | 12/1993 | Pedrono | 351/169 |
| 5,272,495 | 12/1993 | Pedrono | 351/169 |
| 5,285,222 | 2/1994 | Waido | 351/169 |
| 5,444,503 | 8/1995 | Kelch et al. | 351/169 |
| 5,666,184 | 9/1997 | Umeda et al. | 351/169 |
| 5,708,492 | 1/1998 | Kitani | 351/169 |
| 5,708,493 | 1/1998 | Ahsbahs et al. | 351/169 |
| 5,710,615 | 1/1998 | Kitani | 351/169 |
| 5,715,032 | 2/1998 | Isenberg | 351/169 |

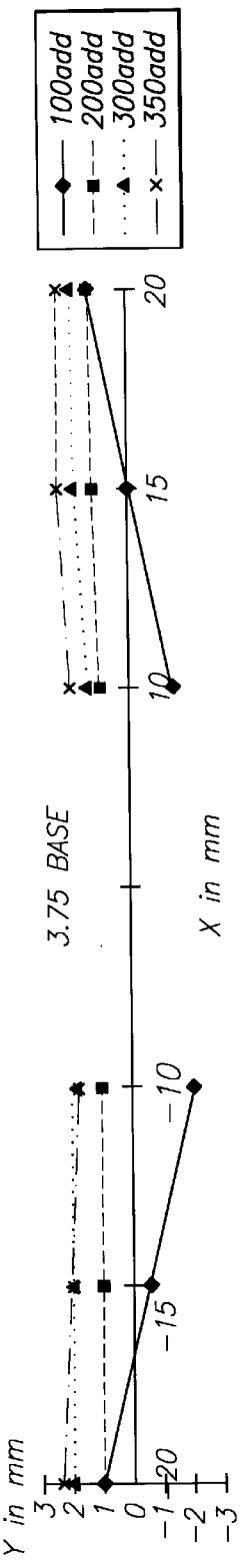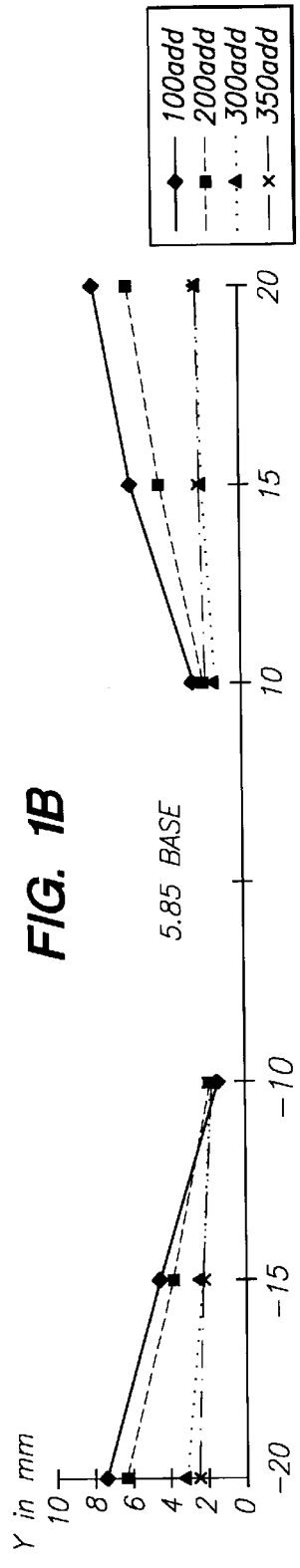

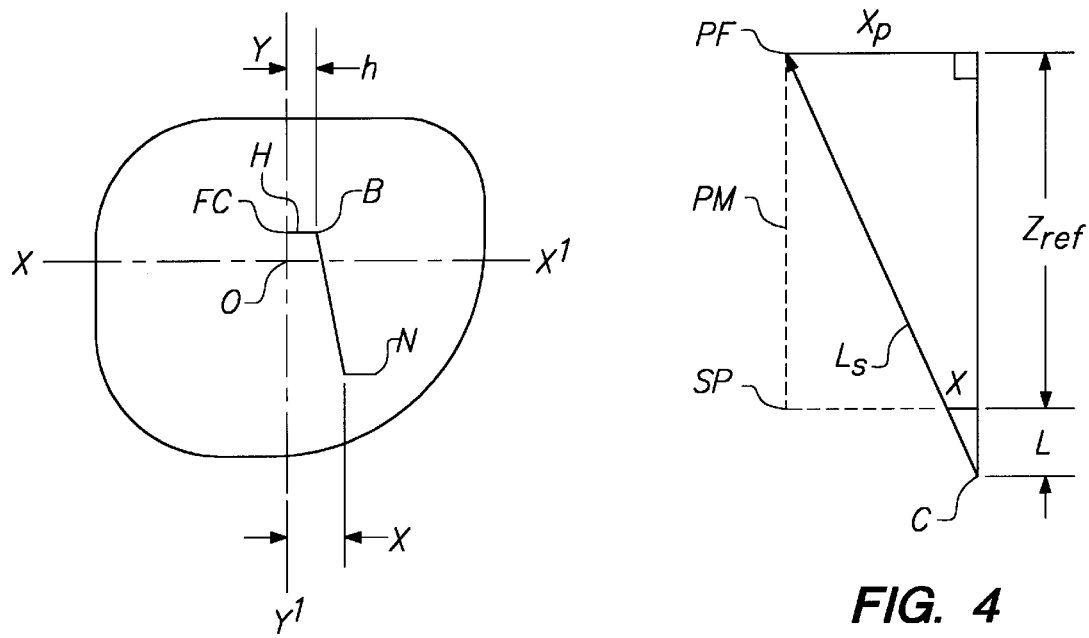
FIG. 3
FIG. 4
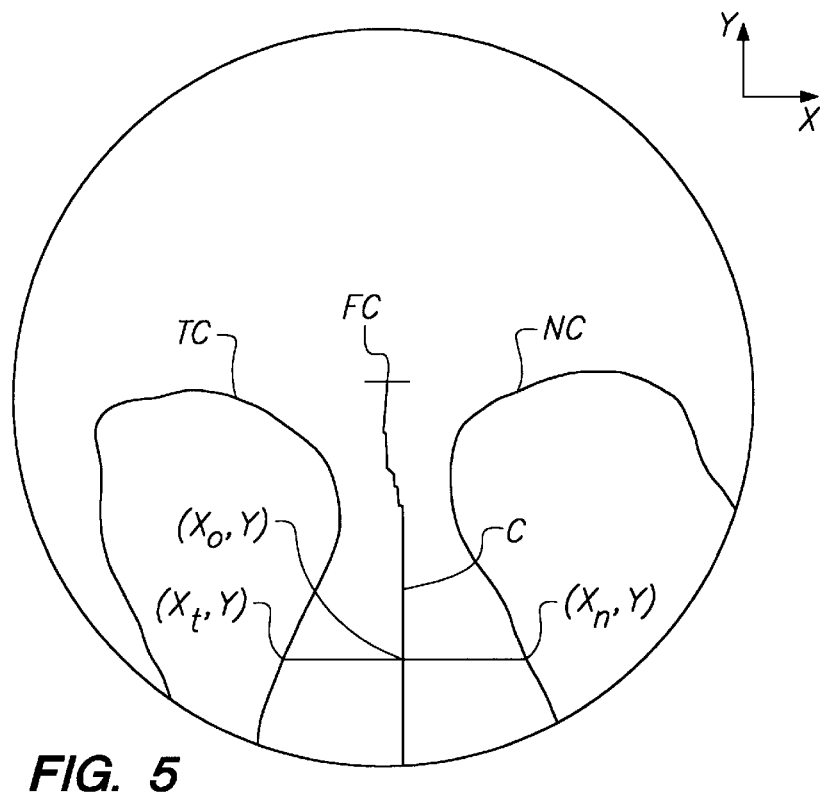
FIG. 5

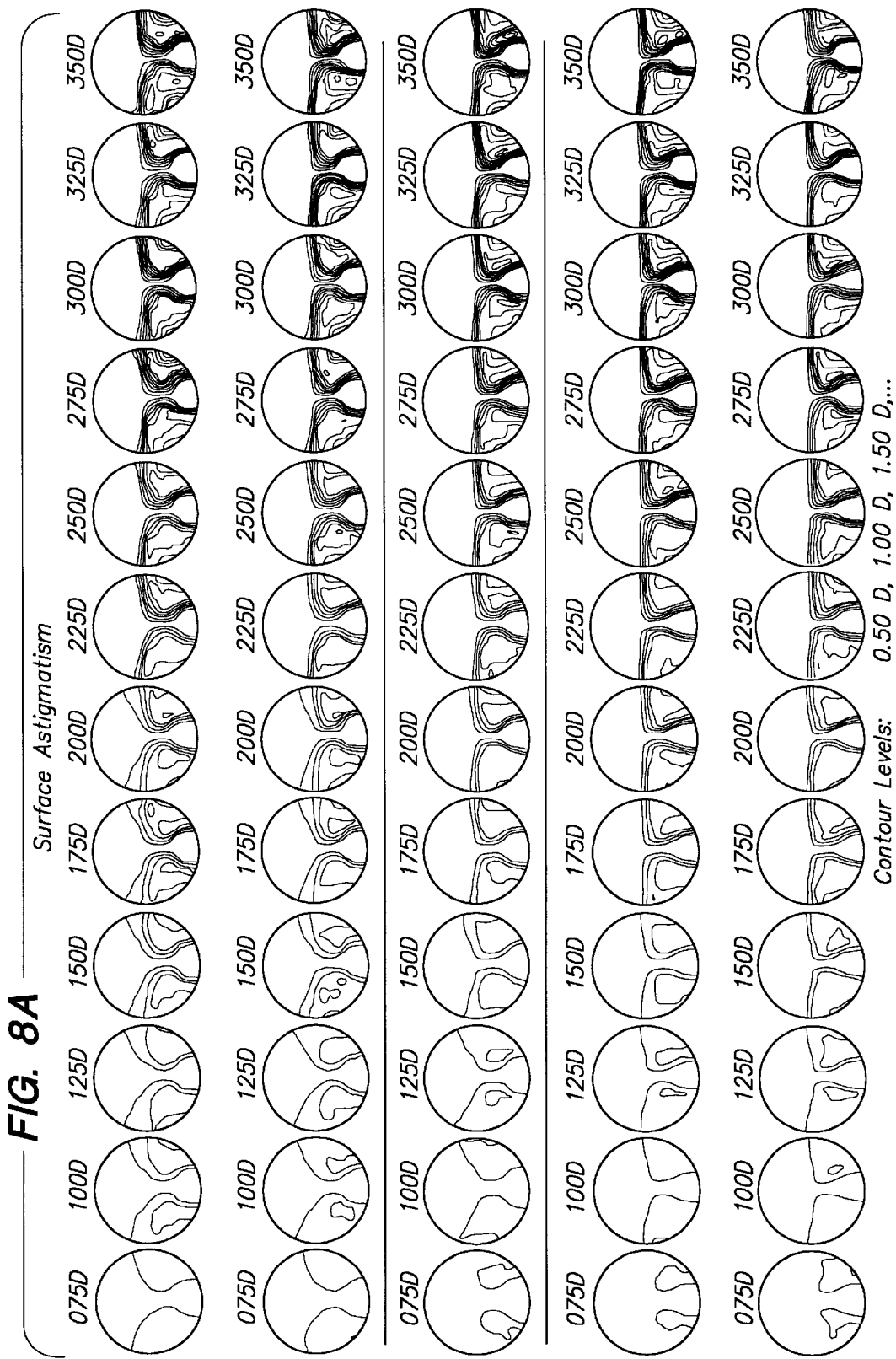

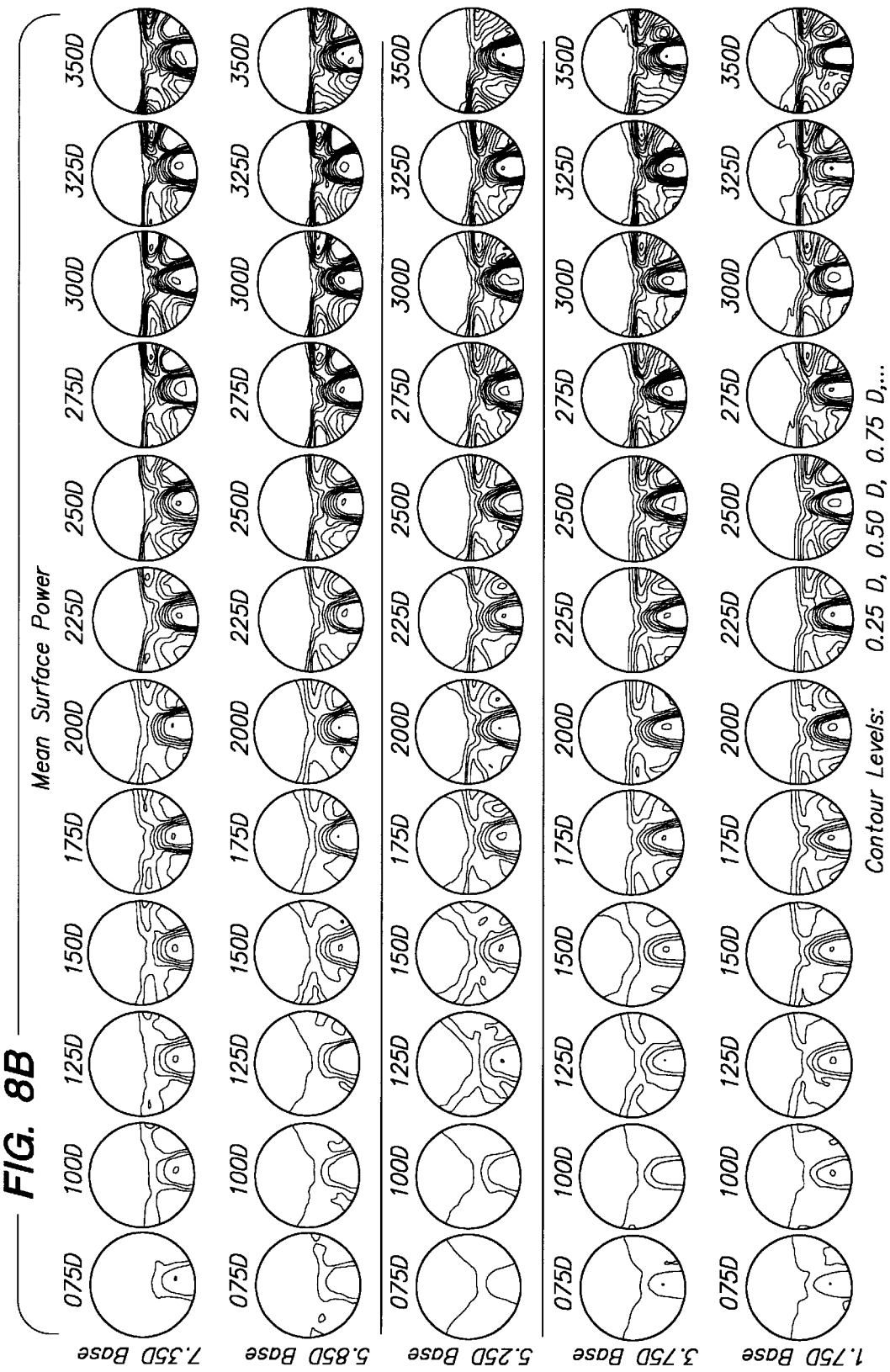

PROGRESSIVE LENS ELEMENTS AND METHODS FOR DESIGNING AND USING SAME

FIELD OF INVENTION

The present invention relates to a progressive ophthalmic lens and in particular to a series of progressive ophthalmic lenses whose designs are determined by the required wearer prescription, and to a process for producing such lenses.

BACKGROUND OF INVENTION AND OBJECTS

Numerous progressive lenses are known in the prior art. Progressive lenses have heretofore been designed on the basis that they have distance, near and intermediate viewing zones. The intermediate zone joins the near and distance zones in a cosmetically acceptable way, in the sense that no discontinuities in the lens should be visible to people observing the lens of the wearer. The design of the intermediate zone is based on a line called the "eye path" along which the optical power of the lens increases more or less uniformly. It is normal to select an eye path to accommodate an assumed convergence of the eyes along the path beginning at a fitting cross in the distance zone and slanting nasally to the near zone.

Applicants have noted that most known progressive lenses are designed based on 1) eyepaths which are optimised in the near viewing region for a refraction distance of 30 cm or closer, a distance at one extreme of the normal range, and
2) eyepaths based on conventional assumptions concerning accommodation converging movement, which do not account for use of the wearer's accommodative reserve, and that
3) the overall design of conventional progressive lenses do not achieve the same balance of useful optical fields of vision for different categories of patients, e.g. myopes, emmetropes and hyperopes.

Accordingly, it would be a significant advance in the art if the progressive lens could more closely relate to the requirements of the individual wearer. It would be a further significant advance if the optimisation of the near viewing region could be altered to a more representative near refraction distance. It would be yet a further advance in the art if a series of progressive lens elements provided the same balance of useful optical fields for different categories of patients.

Accordingly, it is an object of the present invention to overcome, or at least alleviate, one or more of the difficulties and deficiencies related to the prior art. These and other objects and features of the present invention will be clear from the following disclosure.

SUMMARY OF INVENTION

Accordingly, in a first aspect of the present invention, there is provided a series of progressive ophthalmic lens elements, each lens element including a lens surface having an upper viewing zone having a surface power to achieve a refracting power corresponding to distance vision;

a lower viewing zone having a greater surface power than the upper viewing zone to achieve a refracting power corresponding to near vision; and an intermediate zone extending across the lens element having a surface power varying from that of the upper viewing zone to that of the lower viewing zone and including a corridor of relatively low surface astigmatism;

the progressive ophthalmic lens series including a first set of lens elements having at least one base curve suitable for use in providing a range of distance prescriptions for myopes; and a second set of lens elements having at least one base curve suitable for use in providing a range of distance prescriptions for emmetropes, each set containing elements with different addition powers, wherein lens elements from different sets having substantially the same addition power have substantially the same optical field of vision in the lower viewing zone.

Preferably a series of progressive ophthalmic lens elements, each lens element including a lens surface having an upper viewing zone having a surface power to achieve a refracting power corresponding to distance vision;

a lower viewing zone having a greater surface power than the upper viewing zone to achieve a refracting power corresponding to near vision; and a corridor of relatively low surface astigmatism connecting the upper and lower viewing zones, said corridor having a surface power varying from that of the upper viewing zone to that of the lower viewing zone;

the progressive ophthalmic lens series including a first set of lens elements having at least one base curve suitable for use in providing a range of distance prescriptions for myopes; and a second set of lens elements having at least one base curve suitable for use in providing a range of distance prescriptions for emmetropes, each set containing elements with different addition powers, wherein lens elements from different sets having substantially the same addition power have substantially the same optical field of vision in the upper viewing zone.

More preferably a series of progressive ophthalmic lens elements, each lens element including a lens surface having an upper viewing zone having a surface power to achieve a refracting power corresponding to distance vision;

a lower viewing zone having a greater surface power than the upper viewing zone to achieve a refracting power corresponding to near vision;

a corridor of relatively low surface astigmatism connecting the upper and lower zones, said corridor having a surface power varying from that of the upper viewing zone to that of the lower viewing zone;

the progressive ophthalmic lens series including a first set of lens elements having a base curve(s) suitable for use in providing a range of distance prescriptions for a first category of patient; and a second set of lens elements having a base curve(s) suitable for use in providing a range of distance prescriptions for a second category of patient; each lens element within a set differing in prescribed addition power and including a progressive design, in at least one of the upper and lower viewing zones, depending upon the addition power of the lens element;

the lens elements in the first set differing substantively in progressive design from the corresponding lens elements in the second set due to the differences in base curve(s).

In a further aspect of the present invention there is provided a series of progressive ophthalmic lens elements, each lens element including a lens surface having an upper viewing zone having a surface power to achieve a refracting power corresponding to distance vision;

a lower viewing zone having a greater surface power than the upper viewing zone to achieve a refracting power corresponding to near vision;

a corridor of relatively low surface astigmatism connecting the upper and lower zones, said corridor having a surface power varying from that of the upper viewing zone to that of the lower viewing zone;

the progressive ophthalmic lens series including a first set of lens elements having a base curve(s) suitable for use in providing a range of distance prescriptions for a first category of patient; and a second set of lens elements having a base curve(s) suitable for use in providing a range of distance prescriptions for a second category of patient; each lens element within a set differing in prescribed addition power and including a progressive design, in at least one of the upper and lower viewing zones, depending upon the addition power of the lens element;

the lens elements in the first set differing substantively in progressive design from the corresponding lens elements at the same addition power in the second set due to the differences in base curve(s).

Each lens element may be designed to provide good optical quality in the upper and lower viewing zones.

Preferably lens elements from different sets having substantially the same addition power have substantially the same optical field of vision in at least one of the upper and lower viewing zones.

In a further aspect of the present invention there is provided a method of providing more appropriate progressive ophthalmic lenses to a plurality of patients including both myopes and emmetropes, which method includes a) designing a series of progressive lens blanks in which two or more of the lenses have substantially the same addition power and a shared performance characteristic (s) but differ in base curve in order to provide for the differing distance prescriptions of differing categories of patient, including myopes and emmetropes;

b) obtaining a prescription for the patient including a required distance prescription and cylinder correction;

c) selecting a progressive lens blank from the designed series on the basis of distance prescription and cylinder correction thereby obtaining the shared performance characteristic regardless of the category of patient; and d) finishing the back surface of the lens blank to obtain the prescribed distance prescription and cylinder correction.

Preferably the series of lens blanks includes a set of lens blanks for myopes and a set of lens blanks for emmetropes;

wherein each set contains blanks for several commonly prescribed addition powers;

wherein the prescription obtained also includes addition power; and wherein the selection of a progressive lens blank from the designed series is also on the basis of addition power.

More preferably the shared performance characteristics are such that lens elements from different sets having substantially the same addition power have substantially the same optical field of vision in at least one of the upper and lower viewing zones.

A shared characteristic may include corridor length.

In a still further aspect of the present invention, there is provided a method of designing a progressive ophthalmic lens element, the lens element including a lens surface having an upper viewing zone having a surface power to achieve a refracting power corresponding to distance vision;

a lower viewing zone having a greater surface power than the upper viewing zone to achieve a refracting power corresponding to near vision;

a corridor of relatively low surface astigmatism connecting the upper and lower zones, said corridor having a surface power varying from that of the upper viewing zone to that of the lower viewing zone;

wherein the lens element is formed by a) providing a mathematical or numerical representation of a progressive lens surface having a distance viewing zone, a near viewing zone and an eye path corridor wherein the eye path corridor is centered on a line of approximately zero surface astigmatism and has a progressively varying refractive power.

b) rotating and horizontally off-setting the representation of the lens surface below the distance viewing zone in a nasal direction to account for accommodative reserve and the variation of inset caused by the progressive power increase in the eye path corridor;

c) rotating the representation of the lens surface below the eye path corridor in a temporal direction;

d) modifying the representation of the lens surface on the basis of the location of horizontal mid-points between nasal and temporal isoastigmatism curves of a selected dioptric value; and e) forming a lens surface corresponding to the modified representation of the lens surface.

A lens element series may similarly be formed by repeating the above design steps.

Preferably the visual fixation locus is inset generally horizontally in a nasal direction from the fitting cross (FC) of the lens element a horizontal segment distance and extending obliquely down the corridor, the degree of horizontal inset decreasing with increasing addition power.

More preferably both the horizontal segment at the fitting cross height and the near inset vary to achieve convergence at the required task distance.

BRIEF DESCRIPTION OF DRAWINGS

FIGS. 1a, b and c illustrate, for each of three base curves, the variation in the position or width, in upper or distance viewing zone, of the 0.50 D Surface Astigmatism contour with increasing addition power.

FIG. 3 illustrates the visual fixation locus of the wearer utilising a typical lens element according to the present invention.

FIG. 4 illustrates a simplified model of the geometry used to estimate the inset of the visual fixation locus.

FIG. 5 illustrates a schematic contour plot and visual fixation locus of a progressive lens element calculated assuming no accommodative reserve.

FIG. 8a illustrates a series of contour plots of surface astigmatism for a series of progressive lenses according to one aspect of the present invention. The contour plots are broken into three sets: for Hyperopes, Emmetropes and Myopes, respectively, reading from the top of the figure. The numbers given for each plot refer to base curve and Addition Power respectively.

FIG. 8b illustrates a series of contour plots of mean surface power for a series of progressive lenses as illustrated in FIG. 8a.

FIG. 9a illustrates a conventional progressive lens product while

Figure 2A:
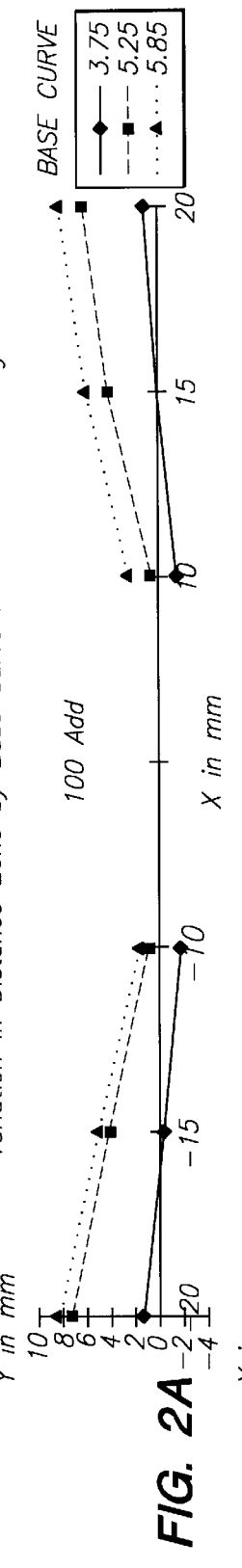
FIGS. 2a, b c and d illustrate, for each of four addition powers, the variation in the position or width, in upper or distance viewing zone, of the 0.50 D Surface Astigmatism contour with increasing distance power or base curve.
Figure 2B:
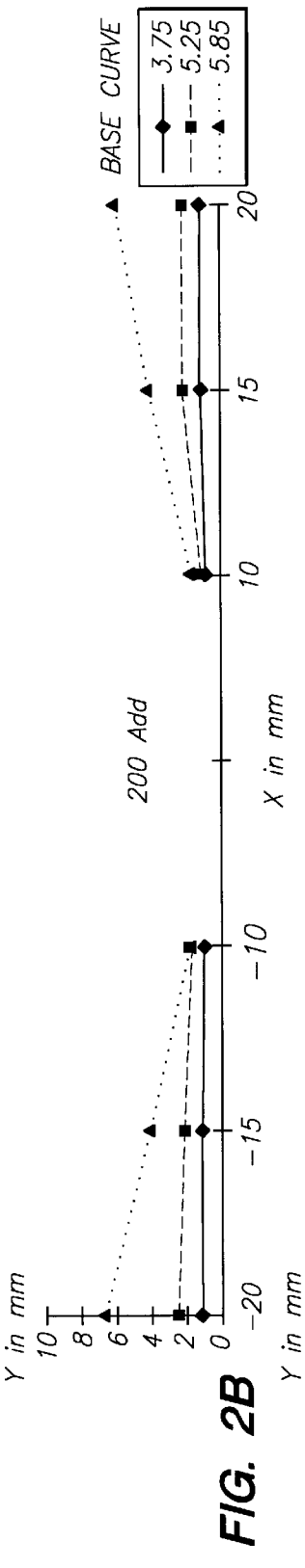
Figure 2C:
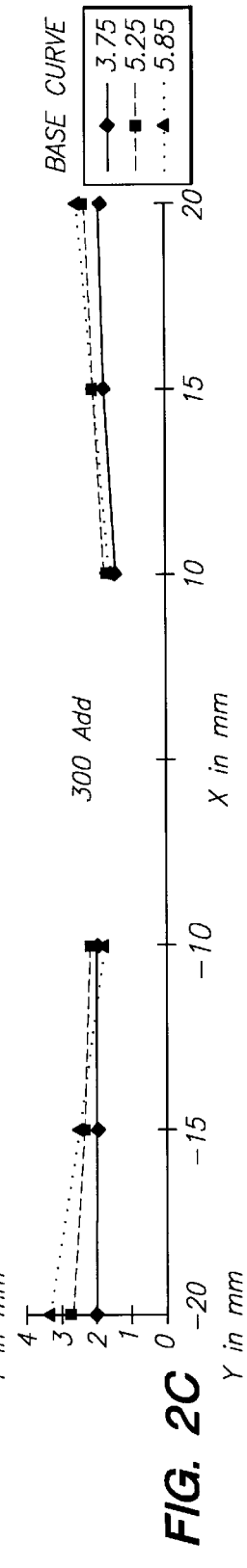
Figure 2D:
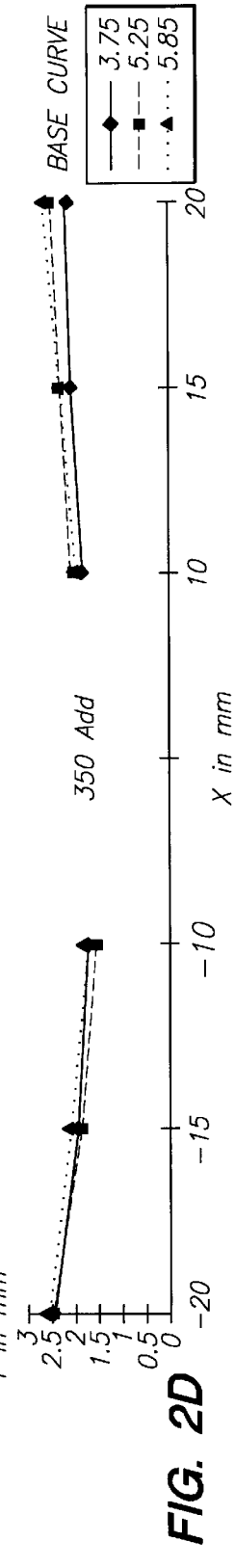

The present invention will now be more fully described with reference to the accompanying figures and examples. It should be understood, however, that the description following is illustrative only and should not be taken in any way as a restriction on the generality of the invention described above.

DETAILED DESCRIPTION

Applicants have found that in order to satisfy the requirements of various wearers at a particular addition power and/or base curve, it is necessary to design a series of lenses whose progressive design elements depend upon the addition power required and the distance prescription of the particular wearer.

The first and second categories of patients referred to herein may be selected from the group consisting of myopes, emmetropes and hyperopes. Preferably the first category are myopic patients and the second category are emmetropic patients.

By the term "progressive design elements", we mean a combination of surface properties of a progressive lens element including, but not limited to, corridor length, visual fixation locus, width of upper viewing zone and width of lower viewing zone.

By the term "differing substantively" we mean that the differences in progressive design between each set contribute to a change in progressive lens optical function (for example differences in near zone width, distance zone width, corridor length).

By the term "optical field of vision" we mean a field defined by the boundary at which blur becomes apparent to the wearer.

The "optical field of vision" is an area or object field viewed from the standpoint of the wearer, and is suitable for foveal vision with minimal loss of acuity. The size of the "optical field of vision", applicants have observed, is influenced by the size of the lens zone, the net magnification in that zone, and the oblique aberration of the lens.

By the term "substantially equivalent", we mean that the boundary of the optical field of vision is similar irrespective of prescription and/or addition power.

By the term "low to medium addition powers" we mean addition powers up to approximately 3.00 D.

By the term "visual fixation locus" we mean the set of points which are the intersection of the lens surface and the patient's line of sight as he or she fixates on objects in the median plane. The term does not signify a required, continuous eye movement path. Rather, the visual fixation locus indicates the set of points corresponding to variously positioned objects in the median plane. As will be explained in detail below, the visual fixation locus takes into account the fact that the wearer may or may not use the accommodative reserve for a particular fixation. As a result, points at different locations on the visual fixation locus are provided having a power sufficient for comfortable use at the appropriate object distances.

In preferred embodiments of the present invention, the visual fixation locus lies along a line of essentially zero surface astigmatism in the intermediate zone. In the distance and near viewing zones, the line of essentially zero surface astigmatism broadens into areas of essentially zero surface astigmatism.

By the term "corridor" we mean an area of the intermediate zone of varying power bounded by nasal and temporal contours of tolerable aberration for foveal vision.

In a preferred embodiment the visual fixation locus lies on the horizontal midpoints between the nasal and temporal contours of tolerable aberration for foveal vision.

Figure 6:
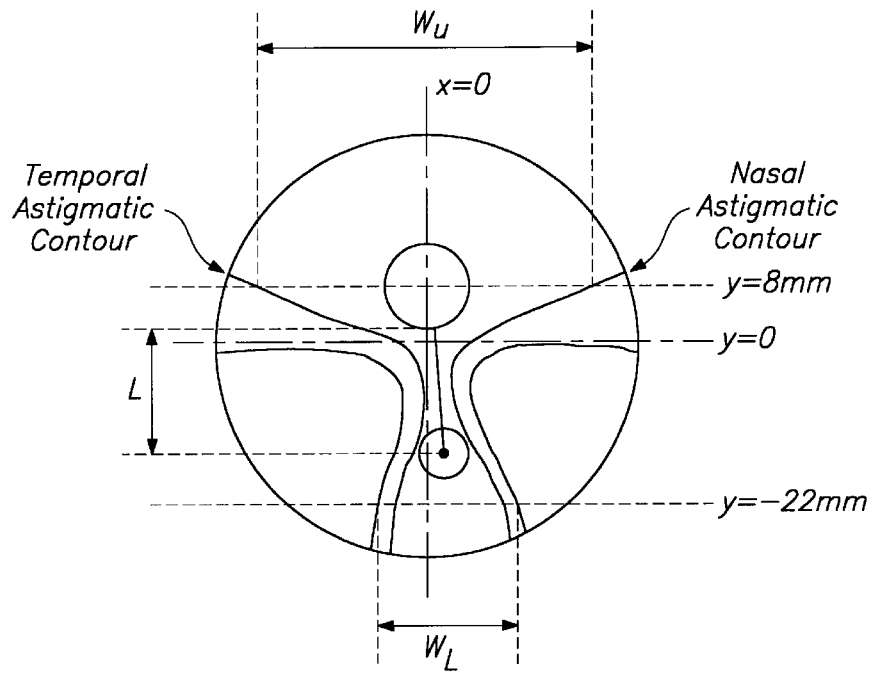
FIG. 6 illustrates a schematic contour plot and visual fixation locus of a progressive lens element according to the present invention, but for a flat spectacle plane.

The corridor has a "corridor length" (L), see FIG. 6, which corresponds to the length of the segment of the visual fixation locus which extends from the vertical height at which the power progression begins to the vertical height of the near zone measurement point. For example, in a typical lens element according to the present invention, the power progression begins at the fitting cross (FC) height.

By the term "width of upper viewing zone" ($W_U$), see FIG. 6, we mean a horizontal dimension on the lens surface bounded by nasal and temporal isoastigmatism contours of a particular value, for example 0.50 D, at a predetermined y value, for example y=8.00 mm.

By the term "width of lower (near) viewing zone" ($W_L$), see FIG. 6, we mean a horizontal dimension on the lens surface bounded by nasal and temporal isoastigmatism contours of a particular value, for example 1.00 D, at a predetermined y value, for example y=−22.00 mm.

By the term "lens element" we mean all forms of individual refractive optical bodies employed in the ophthalmic arts, including, but not limited to, lenses, lens wafers and semi-finished lens blanks requiring further finishing to a particular patient's prescription. Also included are formers used in the manufacture of progressive glass lenses and moulds for the casting of progressive lenses in polymeric material such as the material sold under the trade designation CR39.

By the term "astigmatism or surface astigmatism" we mean a measure of the degree to which the curvature of the lens varies among intersecting planes which are normal to the surface of the lens at a point on the surface.

By the term "myopic patients" we mean patients suffering from short-sightedness: A condition of the eye in which parallel rays of light come to a focus in front of the retina, and which is corrected with a diverging lens.

By the term "emmetropic patients" we mean patients who exhibit a condition of the eye, in which parallel rays of light come to a focus approximately on the retina.

By the term "hyperopic patients" we mean patients suffering from long-sightedness. This is a condition of the eye in which parallel rays of light come to a focus behind the retina, and which is corrected with a converging lens.

Preferably each lens element within a set includes a progressive design in the upper and lower viewing zone depending upon the addition power of the lens element.

In a further preferred aspect, the progressive ophthalmic lens element series may include a third set of lens elements having a base curve(s) suitable for use in providing a range of distance prescriptions for a third category of patient;

each lens element within the third set differing in prescribed addition power and including a progressive design in at least one of the upper and the lower viewing zones depending upon the addition power of the lens elements;

the lens elements in the third set differing substantively in progressive design from the corresponding lens elements at the same addition power in the first and second sets due to the differences in base curve(s).

The third category of patients differs from the first and second categories and may be selected from myopic, emmetropic or hyperopic patients. Preferably the third category of patients are hyperopic patients.

As stated above, applicants have found that the design requirements for progressive lenses differ as to whether the wearer is a myope, emmetrope, hyperope, or other category of patient, the lens base curve, distance prescription and the level of addition power required by the wearer.

Accordingly, in a preferred aspect of the present invention the first set of lens elements, for example for myopic patients, may exhibit a decrease in corridor length as addition power increases through the low to medium addition power range. At higher addition powers the corridor length may exhibit an increase as addition power increases.

For example in a preferred embodiment the corridor length varies from relatively long at low addition powers to relatively short at addition powers of approximately 3.00 diopters (D) and then to a medium length at addition powers greater than 3.00 D.

For example, the corridor length may vary from approximately 19.00 mm to approximately 17.50 mm as addition power increases from 1.00 D to 3.00 D, and then increases to a value of approximately 18.25 mm above 3.00 D.

The first set of lens elements may further include a relatively narrower near viewing zone. The first set of lens elements may exhibit a widening thereof as addition power increases. For example the width of the near viewing zone may vary from relatively narrower at low addition powers to medium at high addition powers.

For example, the horizontal width of the near viewing zone, measured from the temporal 0.50 D astigmatic contour along a horizontal line to the nasal 0.50 D astigmatic contour may be approximately 15.00 mm at the vertical height of −22.00 mm from the geometric lens center for a 1.00 D addition power. The horizontal width of the near viewing zone, measured from the temporal 1.00 D astigmatic contour along a horizontal line to the nasal 1.00 D astigmatic contour may vary from approximately 15.25 mm at the vertical height of −22.00 mm from the geometric lens center for a 2.00 D addition power to approximately 16.00 mm for a 3.00 D addition power.

The first set of lens elements (for example for myopic patients) may further include a relatively wide upper viewing zone with relatively low surface astigmatism. At low addition powers the upper viewing zone may exhibit slightly increased surface astigmatism. The distribution of distance astigmatism may be relatively hard for most addition powers.

For example, the 0.50 D astigmatic contour in the distance zone may be generally flat and relatively unchanged with increasing addition power (see FIG. 1. ("Variation in Distance Zone by Add Power −3.75 D Base")

FIG. 1 illustrates variation in the position or width in the upper or distance viewing zone of the 0.50 D surface astigmatism contour with increasing addition power.

Applicants have established the importance of the 0.50 D contour in the upper viewing zone to wearers. The 3.75 D Base curve is illustrative of the lens elements in the first set.

The second set of lens elements, for example for emmetropic patients, may similarly exhibit a decrease in corridor length as addition power increases. At high addition powers the corridor length may similarly exhibit an increase.

For example the corridor length may vary from relatively long at low addition powers to relatively short at addition powers of approximately 3.00 D and then to a medium length at addition powers greater than 3.00 D.

For example, the corridor length may vary from approximately 19.00 mm to approximately 17.50 mm as addition power increases from 1.00 D to 3.00 D, and then increases to a value of approximately 18.25 mm above 3.00 D.

The second set of lens elements may include a relatively wide near viewing zone. The second set of lens elements may exhibit a decrease in the width thereof as addition power increases. For example, the width of the near viewing zone may vary from wide at low addition powers to medium at high addition powers.

For example, the horizontal width of the near viewing zone, measured from the temporal 0.50 D astigmatic contour along a horizontal line to the nasal 0.50 D astigmatic contour may be approximately 21.00 mm at the vertical height of −22.00 mm from the geometric lens center for a 1.00 D addition power. The near viewing zone may then decrease slightly in width with increasing addition power. The horizontal width of the near viewing zone, measured from the temporal 1.00 D astigmatic contour along a horizontal line to the nasal 1.00 D astigmatic contour may vary from approximately 17.50 mm at the vertical height of −22.00 mm from the geometric lens center for a 2.00 D addition power to approximately 16.00 mm for a 3.00 D addition power.

The second set of lens elements may further include a relatively wide upper viewing zone with width increasing slightly as addition power increases. Surface astigmatism may decrease from moderate to low as addition power increases. The distribution of distance astigmatism may vary from relatively soft for low addition powers to relatively hard for high addition powers.

For example, the 0.50 D astigmatic contour in the distance zone may flatten with increasing addition power (see FIG. 1: "Variation In Distance Zone by Add Power–5.25 D Base"). The 5.25 D Base curve is illustrative of lens elements in the second set.

For a progressive ophthalmic lens series including a third set of lens elements, for hyperopic patients, the third set of lens elements may exhibit a generally constant corridor length, except at high addition powers where it increases.

For example in a preferred embodiment the corridor length varies from relatively long for addition powers up to approximately 2.50 D above which the corridor shortens up to addition powers of approximately 3.00 D beyond which the corridor lengthens to medium.

For example, the corridor length may remain relatively constant at approximately 19.00 mm for addition powers up to 2.50 D decreasing to approximately 17.50 mm as addition power increases to 3.00 D, and then increases to a value of approximately 18.25 mm above 3.00 D.

The third set of lens elements may include a relatively wide near viewing zone for all addition powers.

For example, the horizontal width of the near viewing zone, measured from the temporal 0.50 D astigmatic contour along a horizontal line to the nasal 0.50 D astigmatic contour may be approximately 19.25 mm at the vertical height of −22.00 mm from the geometric lens center for a 1.00 D addition power. The near viewing zone may then decrease in width slightly with increasing addition power, the horizontal width measured from the temporal 1.00 D astigmatic contour along a horizontal line to the nasal 1.00 D astigmatic contour may vary from approximately 18.25 mm at the vertical height of −22.00 mm from the geometric lens center for a 2.00 D addition power to approximately 17.25 mm for a 3.00 D addition power.

The third set of lens elements may further include a relatively wide upper viewing zone. Surface astigmatism may decrease from moderate to low as addition power increases. The distribution of astigmatism in the upper portion of the lens may vary from relatively soft for low addition powers to relatively hard for high addition powers.

For example, the 0.50 D astigmatic contour in the distance zone may be relatively steep for low addition powers and flatten with increasing addition power (See FIG. 1: "Variation in Distance Zone by Add Power−5.85 D)". The 5.85 D base curve is illustrative of the lens elements in the third set.

In a further preferred aspect of the present invention the lens elements may further exhibit a slight increase in corridor length as distance prescription power increases.

That is corridor length may be slightly longer in the third set of lens elements (hyperopic), when present, relative to the second set of lens elements (emmetropic) and in turn relative to the first set of lens elements (myopic), at the same addition power.

For example, the corridor length may vary from approximately 18.25 mm for 2.00 D addition lenses in the first set of lens elements (myopic), to approximately 19.00 mm for 2.00 D addition lenses in the third set of lens elements (hyperopic).

The lens elements may further exhibit a general widening of the near viewing zone as distance prescription power increases.

That is the near viewing zone may be slightly wider in the third set of lens elements (hyperopic), when present, relative to the second set of lens elements (emmetropic) and in turn relative to the first set of lens elements (myopic), at the same addition power.

For example in 2.00 D addition lens elements, the horizontal width of the near viewing zone, measured from the temporal 1.00 D astigmatic contour along a horizontal line to the nasal 1.00 D astigmatic contour may vary from approximately 15.25 mm at the vertical height of −22.00 mm from the geometric lens center in the first set of lens elements (myopic), to approximately 17.25 mm for those in the second set of lens elements (emmetropic) and 18.25 mm in the third set of lens elements (hyperopic).

The lens elements may further exhibit an increase in surface astigmatism in the upper viewing zone in the third set of lens elements (hyperopic), when present, relative to the second set of lens elements (emmetropic) and in turn relative to the first set of lens elements (myopic) at the same addition power.

For example, the 0.50 D astigmatic contour in the distance zone for a 2.00 D addition power lens may be relatively steep for lenses in the third set of lens elements (hyperopic), and flatten with increasing distance prescription for those lens elements in the first set of lens elements (myopic) (see FIG. 2: "Variation in Distance Zone by base curve−2.00 D Adds").

That is, the distribution of astigmatism in the upper portion of the lens element may vary from harder to softer as prescription distance power increases.

FIG. 2 illustrates variation in the position or width in the upper or distance viewing zone of the 0.50 D surface astigmatism contour with increasing distance power or base curve.

In a preferred form, the progressive ophthalmic lens element according to the present invention may have an upper viewing zone in which the surface power is in the range from 0.00 D to 12.00 D, preferably approximately 0.50 D to 9.00 D.

The distance prescription range for myopic patients may extend from approximately −1.50 D to −12.00 D. This may equate to the base curve range for myopic patients. For example, this range may be accommodated by a small number of base curves, typically two or three. For example a 1.75 D base curve and 3.75 D base curve may be used.

The distance prescription range for emmetropic patients may extend from approximately −1.25 D to +1.25 D. This may equate to the base curve range for emmetropic patients. For example this range may be accommodated by a single base curve, for example a 5.25 D base curve.

The distance prescription range for hyperopic patients may extend from approximately +1.50 D to +8.00 D. This may equate to the base curve range for hyperopic patients. For example a preferred range of +1.50 D to +6.00 D may be accommodated by two base curves, for example a 5.85 D base curve and a 7.35 D base curve.

The progressive ophthalmic lens series may include four or more sets of lenses to accommodate other groups of patients. For example additional sets of lenses for high myopic patients and/or high hyperopic patients may be included.

The progressive ophthalmic lens element series may preferably include 5 base curves with 12 addition powers per base curve, for example in 0.25 D increments, resulting in a total of 60 discrete lens element pairs (left and right).

The progressive ophthalmic lens element may be designed to have a smoothly continuous growth of power from the upper viewing zone to the near viewing zone along a corridor of relatively low astigmatism.

The corridor between the upper viewing zone and lower viewing zone may be designed to follow a portion of the visual fixation locus of the wearer. The length of the corridor may range from approximately 10.00 mm to 25.00 mm, preferably from approximately 15.00 mm to 20.00 mm. The power change along the corridor (addition power) may range from approximately 0.50 D to 4.00 D.

As stated above the progressive ophthalmic lens element series may be characterised in that lens elements from different sets having substantially the same addition power have substantially the same optical field of vision in at least one of the upper and lower viewing zones. The progressive design may be provided on a single surface of the lens element.

Preferably each lens element within a set having an addition power between approximately 1.25 D to 3.50 D, preferably approximately 1.50 D to 3.00 D, more preferably 1.50 D to 2.75 D has substantially the same optical field of vision in the upper and/or lower viewing zone for each category of patient.

Preferably the optical field of vision in the upper or distance viewing zone and lower or near distance viewing zone is substantially equivalent for each category of patient.

For example, the lens elements of the second set may exhibit an increased width of the lower viewing zone relative to the lens elements of the first set to achieve substantially equivalent optical fields of vision in that zone.

In an alternative embodiment, the progressive design of each lens element in the near viewing zone is independent of addition power and depending upon the distance prescription of the wearer.

In a further aspect of the present invention there is provided a progressive ophthalmic lens element including a lens surface having an upper viewing zone having a surface power to achieve a refracting power corresponding to distance vision;

a lower viewing zone having a greater surface power than the upper viewing zone to achieve a refracting power corresponding to near vision;

a corridor of relatively low surface astigmatism connecting the upper and lower zones, said corridor having a surface power varying from that of the upper viewing zone to that of the lower viewing zone;

wherein the progressive design (including the corridor location) is dictated at least in part by the visual fixation locus;

the visual fixation locus being inset generally horizontally nasally from the fitting cross (FC) of the lens element a horizontal segment distance and extending obliquely down the corridor, the degree of horizontal inset decreasing with increasing addition power.

Preferably the visual fixation locus is inset nasally relative to the vertical lens meridian in the lower viewing zone proximate the near zone measurement point; the degree of inset generally increasing with increasing addition power in the near zone.

The progressive lens element according to this aspect of the present invention may be a member of the series of progressive ophthalmic lenses described above.

The ophthalmic lens elements according to this aspect of the present invention differ from existing designs in that in existing designs the typical inset of the eyepath in the lower or near viewing zone varies in the range of about 2.00 mm to 4.00 mm for most addition powers. The design is not limited to these parameters, however. Applicant's examination of known progressive lens designs in the prior art reveals that most are designed for a near refraction distance of 30 cm or even less, which requires ocular convergence (binocular rotation of the eyes to view near objects) too great for most wearers, according to current knowledge.

In contrast, the near viewing zone inset according to the present invention varies in a range from approximately 1.50 mm to 4.00 mm, determined by the patients' refraction and fitting parameters (eg. addition power, inter pupillary distance (P.D.), distance prescription (Rx), vertex distance, near refraction distance, accommodative reserve).

In a preferred aspect, the degree of horizontal inset may exhibit a small increase as the distance prescription becomes more positive (for example up to approximately 0.2 mm).

The eye paths used in designing prior art progressive lenses do not accurately correspond with the desired visual fixation locus of the wearer (see FIG. 3 below). Applicants have discovered that depending on the power in the upper viewing zone and/or on the addition power of the particular prescription of the wearer, the wearer may use nasal portions of the upper viewing zone for objects at far intermediate distances rather than using the intermediate zone. The degree of horizontal inset at the fitting cross may thus be related to the accommodative reserve of the wearer. The accommodative reserve of the wearer will decrease with age and will thus generally correspond to a requirement for increased addition power with age.

The horizontal segment at the fitting cross height varies— up to approximately 1.50 mm preferably up to approximately 1.00 mm depending upon the distance prescription and addition power of the particular wearer. A typical value is 0.75 mm for a +2.00 D distance prescription and 1.00 D add lens. In general, the extent of lateral inset will decrease with increasing addition power of the wearer.

Thus, it will be understood that the visual fixation locus is a line having a horizontal segment extending nasally from the fitting cross and a nasally inclined segment extending from the nasal end of the horizontal segment to the near viewing zone.

Both the horizontal segment at the fitting cross height and the near inset may vary to achieve convergence at the required task distance. The variation in lens magnification results in a required variation or adjustment of inset on the lens surface so as to correctly place points on the visual fixation locus, such as the near zone measurement point, so that the appropriate convergence can be achieved for the required working distance and visual task. Lens magnification effects may in turn be influenced by surfacing recommendations including lens thickness and the pantoscopic tilt of the lens.

The length of the horizontal segment at the fitting height is determined by consideration of the lens magnification and the visual convergence that occurs due to a wearer reflexively utilising their accommodative reserve for intermediate tasks in the region of the progressive lens typically used for distance vision tasks. Determination of the visual convergence requires consideration of the minimum working distance for intermediate vision before the wearer utilises additional visual assistance provided by the progressive lens.

The resulting visual fixation locus is such that at the fitting cross the eye within the upper viewing zone for distance visual tasks, persists at the fitting height for distant to far intermediate visual tasks and moves nasally (horizontally) during convergence to a maximum inset determined by the limit of comfortable accommodation without additional optical assistance. A second segment of the visual fixation locus then continues along a line joining the inset at the fitting cross height to the inset at the near visual point along a locus that is related to the power provided by the corridor of the progressive lens for intermediate to near visual tasks. This is illustrated in FIG. 3. Given the provision of the horizontal segment of the visual fixation locus at the fitting cross height and given the selection of the inset of the point of full nominal add power at the end of the nasally inclined segment of the visual fixation locus, the slope of the visual fixation locus is significantly smaller than the slope of "eye paths" used to design conventional progressive lenses, at least for the low to medium add powers.

FIG. 3 illustrates the visual fixation locus of the wearer utilising a typical lens element according to the present invention.

In FIG. 3:

XX' is the horizontal line passing through the optical center "O" and YY' is a corresponding vertical line.

FC is the fitting cross point

H is the horizontal inset segment of length h

N is the "near zone measurement point"

[B–N] is the oblique segment of the visual fixation locus which may be used for objects at mid to near intermediate distance "x" is the near segment inset (the horizontal distance between YY' and N)

Spectacles are fit such that the wearer perceives distant objects through the upper viewing zone in the vicinity of the fitting cross (FC). For closer objects, that is in the far intermediate range, the wearer may continue to use the upper viewing zone, in which case the eye fixates at one or more points on the visual fixation locus generally horizontally to a point B, until the accommodative effort of the wearer is sufficiently great to require further accommodative assistance. The visual fixation locus then proceeds obliquely along the corridor. This second segment of the visual fixation locus is slightly nasally inclined. For near vision, the wearer uses the near viewing zone. The near visual point N (i.e. the point on the visual fixation locus where nominal add power is measured) is inset a near segment inset distance "x" from the vertical axis YY'.

The lens may be rotated to achieve optimum performance for specific fitting characteristics of individual wearers. A progressive lens constructed according to the present invention may have a corridor and an optical field of vision which are substantially correct for the majority of wearers. For a wearer who requires significantly different fitting, it is possible to rotate the lens to optimise near zone inset for the individual without significantly changing the fitting cross inset.

As a matter of background, it will be understood that in order to achieve a proper fit with, for example, a pair of segmented multifocal lenses, it is preferred to space the optical centers of the distance portion of both lenses in a pair of spectacles according to the patient's interpupillary distance (PD) corresponding to distance vision and to align the segments so that correct binocular visual performance is achieved. To do this, it is necessary to align the segments of the lenses so that the segment centers coincide with the binocular lines of sight and so that the visual boundaries created by the outlines of the segments overlap to obtain the maximum possible binocular field of view.

To meet the first condition, center alignment, it is customary when prescribing bifocals to specify both a distance and near PD, and the lens may be surfaced to achieve a specified lateral inset between the optical center of the distance portion and the center of the segment. To determine the inset, the near PD must be calculated using several variables. Although the distance PD is anatomically fixed, the near PD of a patient varies according to the geometry of the eye, spectacle, and task. Typically, for a distance PD of 64 mm, the near PD is about 4 mm less than the distance PD. These numbers are derived from the geometry shown in FIG. 4 which illustrates Bifocal inset.

In FIG. 4

PF is the Point of Fixation

PM is the Patient Midline (mid-sagittal plane)

SP is the Spectacle Plane $L_s$ is the line of sight

C is the Center of rotation of the eye

It will be understood that this geometry is approximate and relates to the intersection of line segments with a flat spectacle plane and may be generalised in a straight forward manner for lenses having, given base curve, prescribed refractive power and/or prism.

By similar triangles the equation which determines the segment inset is:

$$x = \frac{X_p L}{Z_{ref} + L}$$

wherein

Xp=monocular PD $Z_{ref}$=near refraction distance determined by the refractionist L=distance from spectacle plane to center of rotation of the eye x=segment inset For typical values of L=27 mm, $X_p$=32 mm, and $Z_{ref}$=400 mm, this leads to a segment inset of x=2.00 mm for each lens.

Unlike bifocals, progressive lenses have not been designed in the prior art to allow a dispenser to specify a near PD independent of the distance PD. The location of the effective area of the reading prescription has traditionally been chosen for a progressive lens by its designers, and cannot be altered to allow for various combinations of PD and reference distance.

FIG. 5 illustrates a comparative model which ignores accommodative reserve. The point FC is referred to as the fitting cross, and is the reference point for fitting while the patient is looking at a distant object. The progressive addition lens has an intermediate corridor and a near zone, bounded laterally by the lines forming the "Temporal astigmatic contour" (TC) and "Nasal astigmatic contour" (NC). The numerical magnitude of astigmatism is constant and equal on each of these astigmatic contours. Different contours may be used for each zone, for example the contour value may be 0.75 D for the intermediate zone and 1.00 D for the near zone.

The coordinates of points on the temporal astigmatic contours are denoted by ($x_t$, y) where x and y are expressed in millimeters. The coordinates of the points on the nasal astigmatic contour are likewise denoted by ($x_n$, y).

The mid-line of the intermediate and near zones is defined by the curve labelled "C", which is located at the midpoint of the corresponding nasal and temporal astigmatic contours along each horizontal line intersecting those contours. A mid-line meridian located between 1 diopter isoastigmatism curves is discussed in U.S. Pat. No. 3,785,724.

Along the curve C, the add power may increase smoothly from nearly zero at the fitting cross until it reaches the nominal add power some distance below.

The function which describes this increase in power is called the power function.

It is denoted by $\overline{P}(y)$ and represents the dioptric value of the mean add power on the slanted portion of curve C at a point y mm below the fitting cross.

It is then possible to define the position of curve C as $$x(y) = \frac{LX_p\hat{P}(y)}{Z_{ref} + L\hat{P}(y)} \tag{1}$$

where x(y) is the inset of curve C for vertical positions between the fitting cross and near zone L is the distance from the lens to the center of rotation of the eye $X_p$ is the monocular PD $\hat{P}(y)=\overline{P}(y)/P_{ref}$ is the normalised power function which is determined by the power function $\overline{P}(y)$ and $P_{ref}$ the nominal add power specified by the refractionist and $Z_{ref}$ is the near refraction distance, which may be defined as approximately 40 cm for add powers less than approximately 2.50 D, and is approximately the reciprocal of the nominal add power for add powers greater than or equal to 2.50 D.

This definition assumes that the appropriate fixation locus convergence is one which is aligned for working distances which are reciprocally related to the normalised power function. That is, if the available add power at a point on the lens is one fourth the nominal add power of the lens, then the working distance is four times the near refraction distance. However, it may be more appropriate to base the lens design on a fixation locus which corresponds accurately with the position likely to be used by the wearer.

As discussed above, from clinical observation and experiments by applicants, a horizontal inset at the fitting cross height may be provided which is dependent upon the patient's accommodative reserve, and therefore the nominal add power. For instance, it is highly unlikely that a 1.00 D add wearer will use the intermediate zone for distances farther than about 80 cm, because this wearer can use the distance zone and comfortably accommodate for distances as close as about 80 cm. Likewise, it is unlikely that the 2.50 D add wearer will use the intermediate zone for distances much farther than 200 cm, for the same reason.

To accomplish this offset, it is only necessary to substitute the convergence compensated power function $\tilde{P}(y)$ for the normalised power function $\hat{P}(y)$ in equation (1):

$$x(y) = \frac{LX_p \tilde{P}(y)}{Z_{ref} + L\tilde{P}(y)} \quad (2)$$

where $\tilde{P}(y)$ is the convergence compensated power function $$\tilde{P}(y) = \frac{\overline{P}(y) + k(P_{ref})}{P_{ref} + k(P_{ref})} \quad (3)$$

and $k(P_{ref})$ is a function of the nominal add power of the zone.

According to this definition and shown in FIG. 6, the second segment of the visual fixation locus passes nasally of the fitting cross at its top, but reaching the inset which is appropriate for the near refraction distance at the near zone measurement point.

An investigation of the possible forms of $k(P_{ref})$ indicates that a linear function may be suitable. The value for this function for any given nominal add may be thought of as establishing a tolerable level of accommodation or depth of focus to be employed by the patient for viewing far intermediate range objects. For instance, the particular function $$k(P_{ref}) = \frac{2}{3} - \frac{P_{ref}}{6} \quad (4)$$

leads to the very uppermost portion of the intermediate, at the fitting cross height, being aligned for an 80 cm distance in the 1.00 add, but a 220 cm distance in the 2.50 add.

Equations (1) and (2) represent the inset of curve "C" in the spectacle plane. It is necessary to calculate the true points on the lens surface to design the lens so that curve "C" is positioned to compensate for the lens form.

Equation (2) can be arranged to give the working distance ($\tilde{Z}(y)$) at a point y mm below the fitting cross as a function of $\tilde{P}(y)$, the convergence compensated power function, and $Z_{ref}$, the near refraction distance $$\tilde{Z}(y) = \frac{Z_{ref}}{\tilde{P}(y)} \quad (5)$$

Figure 7:
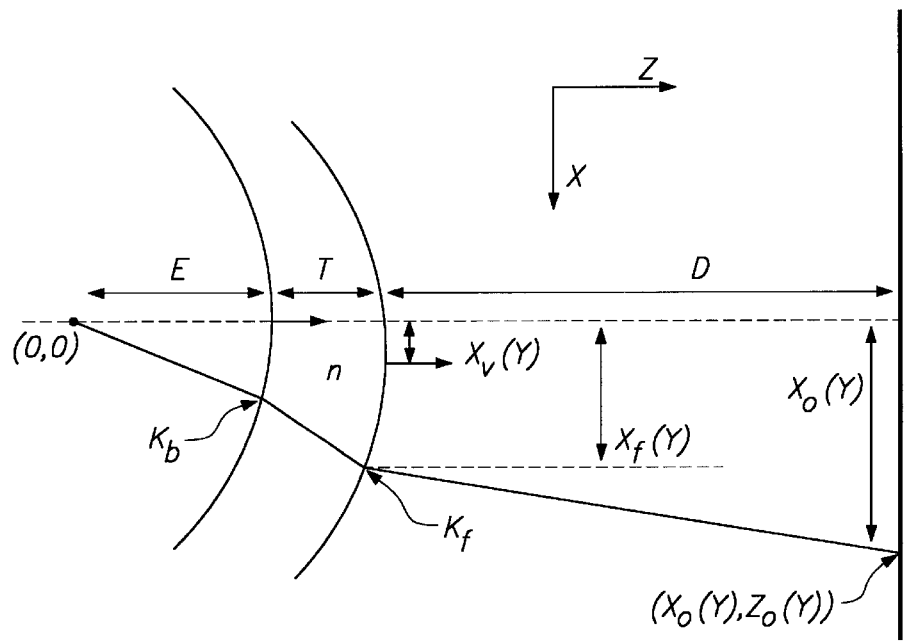
FIG. 7 illustrates a ray trace modification to adjust the inset $x_i(y)$ to compensate for the presence of a curved lens of finite thickness.

The corresponding point on the lens surface required to view an object at the distance $\tilde{Z}(y)$ is dependent on the lens form and can be calculated by a ray trace constructed according to FIG. 7, where $x_f$ is the inset on the lens surface for a given object at $(x.=x_0, z=Z_0)$ and a lens of the form such that where the chief ray intersects the respective surfaces the back surface curvature is $K_b$ and the front surface curvature is $K_f$, with a lens thickness T, eye distance E, vertex displacement $x_v$ between the front and rear lens surfaces and a lens material index n.

Thus the position of the visual fixation locus varies with the back surface curvature $K_b$, front surface curvature $K_f$, lens thickness T, eye distance E, vertex displacement $x_v$ and lens material refractive index n.

Method of Designing Progressive Lens Element

Lenses of the type shown in FIG. 6 can be designed as follows:

a) providing a mathematical or numerical representation of a progressive lens surface having a distance viewing zone, a near viewing zone and an eye path corridor wherein the eye path corridor is centered on a line of approximately zero surface astigmatism and has a progressively varying refractive power. The eye path corridor connects the distance and near viewing zones, the representations of the distance viewing zone, near viewing zone and eye path corridor initially being mirror symmetric about a vertical mid-line x=0, selection of corridor lengths and zone parameters as described above;

b) rotating and horizontally off-setting the representation of the lens surface below the distance viewing zone in a nasal direction to account for accommodative reserve and the variation of inset caused by the progressive power increase in the eye path corridor as described above;

c) rotating the representation of the lens surface below the eye path corridor in a temporal direction;

d) modifying the representation of the lens surface so that the line of approximately zero surface astigmatism below the fitting cross lies at the horizontal mid-point between nasal and temporal isoastigmatism curves of a selected dioptric value (for example the 1 diopter isoastigmatism curve);

e) modifying the representation of the lens surface so that the horizontal mid points between nasal and temporal isoastigmatism curves of a selected dioptric value in the near zone lie along a line which intersects the line of approximately zero astigmatism at the top of the near zone and extends towards the bottom of the lens; and f) forming a lens surface corresponding to the modified representation of the lens surface.

In the modification steps (d) and (e), the final lens surface is not constrained in such a way that it has substantial bilaterally symmetric surface astigmatism or power at various horizontal distances from the mid-line.

Rather, the lens design is only loosely constrained, in such a way that the edge of the useful portions of the lens (as, for example, defined by the 1 diopter isoastigmatism curve boundaries) are centered on the zone midline or visual fixation locus.

Steps (d) and (e) may be performed by finite element methods. A merit function may be employed to achieve the desired location of the selected isoastigmatism curves. One or both of the nasal and temporal isoastigmatism curves of the selected dioptric value may be locally adjusted as required to give the corridor mid-line the desired insets and slope at locations consistent with the power progression and assumptions concerning accommodative reserve discussed above.

Method of Providing Finished Progressive Lenses

In a still further aspect of the present invention the applicants contemplate a method of providing more appropriate progressive ophthalmic lenses to a plurality of categories of patients for example myopes and emmetropes. This method includes:

a) Designing a series of progressive lens blanks in which two or more of the lenses have substantially the same addition power and a shared performance charecteristic (s) but differ in base curve in order to provide for the differing distance prescriptions of different categories of patients. Such shared performance characteristics include, for example, the same size optical field of vision for the upper and/or lower viewing zone;

b) Obtaining a prescription for the patient including a required distance prescription, addition power and cylinder correction;

c) Selecting a progressive lens blank from the designed series on the basis of distance prescription, addition power and cylinder correction thereby obtaining the shared performance characteristic regardless of distance prescription; and d) Finishing the back surface of the lens blank to obtain the prescribed distance prescription and cylinder correction.

Preferably the shared performance characteristics are such that each lens blank within at least a portion of a set has a progressive design such that the optical field of vision in the upper and/or lower viewing zone, as measured for the mid point of the prescription range, is substantially equivalent for each category of patient.

EXAMPLE

The following description illustrates the operation of the method of the present invention by a specific numerical example.

Figure 9A:
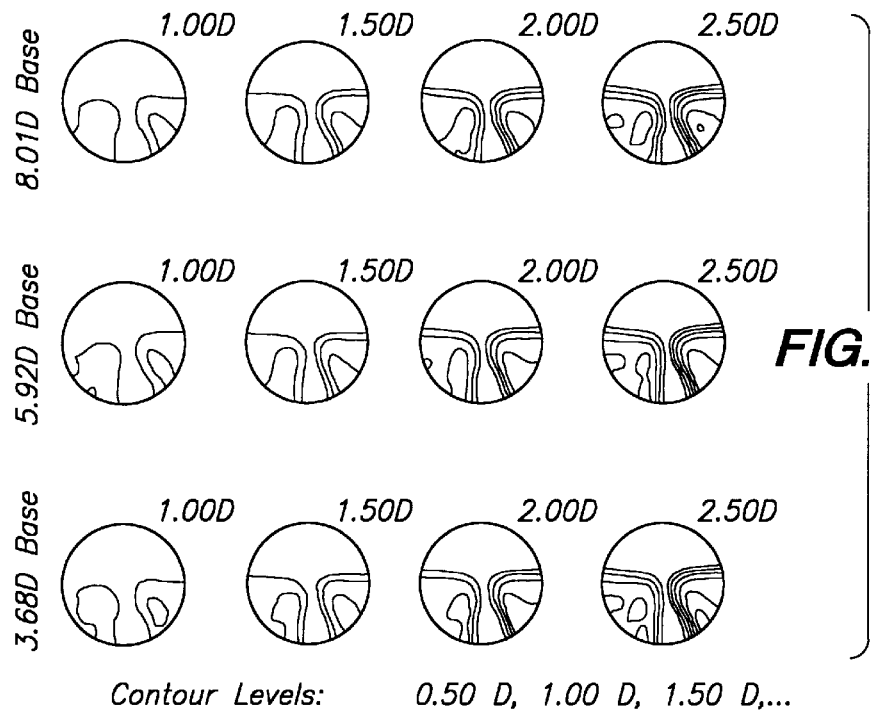
Figure 9B:
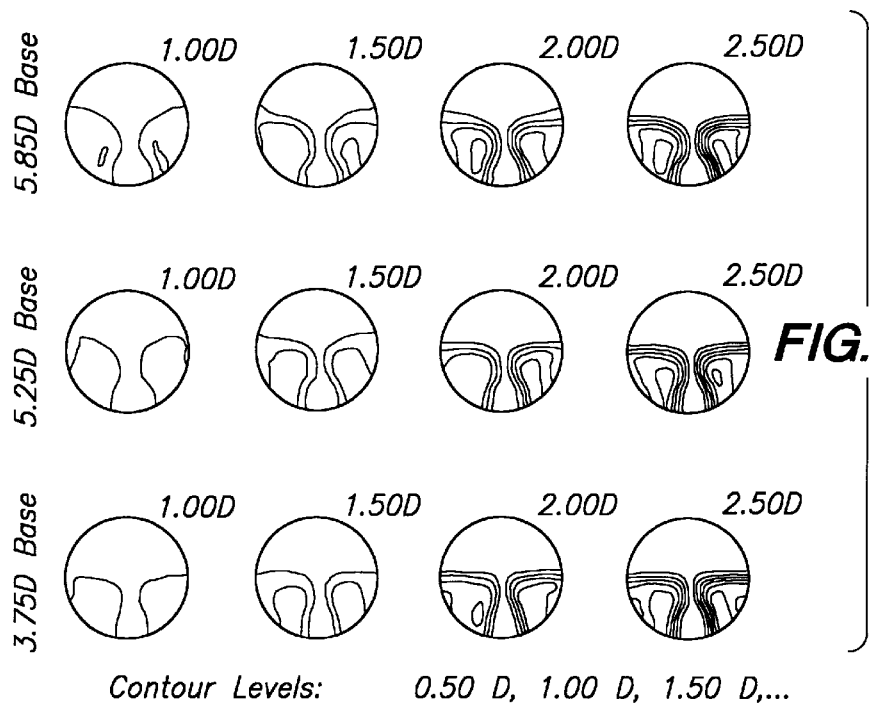
FIG. 9b shows the lens series of FIGS. 8a and 8b according to the present invention in a similar format. From the illustrations it can be seen that the conventional progressive lens does not include the features of the present invention. In particular it can be seen that the variations contained in the conventional progressive lens product are those that would result simply from scaling alone with respect to addition power, and contain no variation with change in base curve.

A lens element having a 5.85 D base curve and 1.00 D addition power as illustrated in FIGS. 8a, 8b and 9b, according to the present invention may be constructed as follows.

The required characteristics of the lens element are as follows:

| | |
|---|---|
| Base | 5.85 D (@ 1.530) |
| Add | 1.00 D |
| Horizontal inset at fitting cross $x_f(2)$ | 0.75 mm |
| Material index | 1.499 |
| Eye center of rotation Distance L | 27 mm |
| Distance Rx | +2.00 D |
| Near reaction distance $Z_{ref}$ | 400 mm |
| Monocular PD (Xp) | 32 mm |
| Near Vertex displacement $X_v$ (−17) | 0.45 mm |
| Fitting Cross Vertex displacement $X_v$ (2) | 0.00 mm |
| Lens thickness at Fitting Cross T (2) | 2.01 mm |
| Lens thickness at near T (−17) | 1.47 mm |
| Pantoscopic tllt | 7° |
| Resulting near zone inset $X_f$ (−17) | 2.34 mm |

Utilising equation (5) and incorporating an appropriate y value, y=2, and completing a ray trace as illustrated in FIG. 7 to compensate for the lens form, the inset $X_f$ is calculated at 2.34 mm Utilising equation (5) and incorporating an appropriate y value y=−17, then completing a ray trace as illustrated in FIG. 7 to compensate for the lens form, the horizontal inset h (at fitting cross) is calculated at 0.75 mm. Other lens elements according to the present invention were designed in a similar manner.

Finally, it is to be understood that various other modifications and/or alterations may be made without departing from the spirit of the present invention as outlined herein.

We claim:

1. A progressive ophthalmic lens element series, each lens element including a lens surface having an upper viewing zone having a surface power to achieve a refracting power corresponding to distance vision;

a lower, near viewing zone having a greater surface power than the upper viewing zone to achieve a refracting power corresponding to near vision; and a corridor of relatively low surface astigmatism connecting the upper and lower zones, said corridor having a surface power varying from that of the upper viewing zone to that of the lower viewing zone;

wherein the corridor location is dictated at least in part by the visual fixation locus;

the visual fixation locus being inset generally horizontally nasally from the fitting cross (FC) of the lens element a horizontal segment distance and extending obliquely down the corridor, the horizontal segment distance decreasing with increasing addition power.

2. A progressive lens element series according to claim 1, wherein the visual fixation locus is inset nasally relative to the vertical lens meridian in the lower viewing zone proximate the near zone measurement point; the degree of inset generally increasing with increasing addition power in the near zone.

3. A progressive lens element series according to claim 2, wherein the lower viewing zone inset varies in the range from approximately 1.50 mm to 4.00 mm, determined by the patient's refraction and fitting parameters and lens form.

4. A progressive lens element series according to claim 2, wherein the degree of horizontal inset exhibits a small increase as the distance prescription becomes more positive.

5. A progressive lens element series according to claim 4, wherein the horizontal segment distance at the fitting cross height varies up to approximately 1.50 mm depending on the distance prescription and addition power of the wearer.

6. A progressive lens element series according to claim 2, wherein both the horizontal segment at the fitting cross height and the near inset vary to achieve convergence at the required task distance.

7. A lens element series according to claim 1, wherein the position of the visual fixation locus varies with the back surface curvature $K_b$, front surface curvature $K_f$, center thickness T, eye distance E, vertex displacement $x_v$, and lens material refractive index n.

8. A lens element series according to claim 7, wherein the position of the visual fixation locus is calculated by utilising ray tracing techniques in accordance with the requirement that $$Z(y) = \frac{Z_{ref}}{\tilde{P}(y)}$$

where

Z(y) is the object distance, $Z_{ref}$ is the near refraction distance, $\tilde{P}(y)$ is the convergence compensated power function and $$\tilde{P}(y) = \frac{\overline{P}(y) + k(P_{ref})}{P_{ref} + k(P_{ref})}$$

where P1 $\overline{P}(y)$ is the power function, P1 $P_{ref}$ is the nominal addition power, and $k(P_{ref})$ is a function series: $k(Pref=\frac{2}{3}-Pref/6$.

9. A lens element series according to claim 8, wherein the near refraction distance $Z_{ref}$ is approximately 40 cm for addition powers less than approximately 2.50 D and is approximately the reciprocal of the nominal addition power for addition powers greater than or equal to 2.50 D.

10. A lens element series according to claim 2, wherein the visual fixation locus reaches the near inset which is appropriate for the near refraction distance at the near zone measurement point.

11. A method of designing a progressive ophthalmic lens element, the lens element including a lens surface having:
- an upper viewing zone having a surface power to achieve a refracting power corresponding to distance vision;
- a lower viewing zone having a greater surface power than the upper viewing zone to achieve a refracting power corresponding to near vision;
- a corridor of relatively low surface astigmatism connecting the upper and lower zones, said corridor having a surface power varying from that of the upper viewing zone to that of the lower viewing zone;

wherein the lens element is formed by
(a) providing a mathematical or numerical representation of a progressive lens surface having a distance viewing zone, a near viewing zone and an eye path corridor wherein the eye path corridor is centered on a line of approximately zero surface astigmatism and has a progressively varying refractive power;
(b) rotating and horizontally off-setting the representation of the lens surface below the distance viewing zone in a nasal direction to account for accommodative reserve and the variation of inset caused by the progressive power increase in the eye path corridor;
(c) rotating the representation of the lens surface below the eye path corridor in a temporal direction;
(d) modifying the representation of the lens surface on the basis of the location of horizontal mid-points between nasal and temporal isoastigmatism curves of a selected dioptric value; and
(e) forming a lens surface corresponding to the modified representation of the lens surface.

12. A method according to claim 11, wherein in the modification step (d), the final lens surface is not constrained in such a way that it has substantial bilaterally symmetric surface astigmatism or power at various horizontal distances from the mid-line.

13. A method according to claim 12, wherein the lens design is only loosely constrained, in such a way that the edge of the useful portions of the lens are centered on the zone mid-line or visual fixation locus.

14. A method according to claim 12, wherein step (d) is performed utilizing a finite elements method.

15. A method according to claim 11 wherein the series of progressive lens elements comprises plural sets of lens elements, each set having a different base power suitable for use in providing a range of distance prescriptions and wherein the width of the upper viewing zone is an increasing function of base power.

16. A series of progressive ophthalmic lens elements, each lens element including a lens surface having:
- an upper viewing zone having a surface power to achieve a refracting power corresponding to distance vision;
- a lower viewing zone having a greater surface power than the upper viewing zone to achieve a refracting power corresponding to near vision; and
- a corridor of relatively low surface astigmatism connecting the upper and lower viewing zones, said corridor having a surface power varying from that of the upper viewing zone to that of the lower viewing zone;

the progressive ophthalmic lens series including at least three sets of lens elements, each set having a different base power suitable for use in providing a range of distance prescriptions, wherein the width of the upper viewing zone is an increasing function of base power.

17. A series of progressive ophthalmic lens elements, each lens element including a lens surface having:
- an upper viewing zone having a surface power to achieve a refracting power corresponding to distance vision;
- a lower viewing zone having a greater surface power than the upper viewing zone to achieve a refracting power corresponding to near vision; and
- a corridor of relatively low surface astigmatism connecting the upper and lower viewing zones, said corridor having a surface power varying from that of the upper viewing zone to that of the lower viewing zone;

the progressive ophthalmic lens series including
- a first set of lens elements having at least one base curve suitable for use in providing a range of distance prescriptions for myopes;
- a second set of lens elements having at least one base curve suitable for use in providing a range of distance prescriptions for emmetropes, and
- a third set of lens elements having at least one base curve suitable for use in providing a range of distance prescriptions for hyperopes;
- each set containing elements with different addition power, wherein lens elements from different sets having substantially the same addition power have shared optical characteristics in at least the upper viewing zone, such that the width of the upper viewing zone is an increasing function of base power.

* * * * *